United States Patent
Kershaw et al.

(10) Patent No.: US 6,624,546 B2
(45) Date of Patent: Sep. 23, 2003

(54) RADIO-FREQUENCY INTERFERENCE SUPPRESSING CHOKE WITH ELONGATED PORTIONS FOR BRUSH-TYPE MOTORS

(75) Inventors: Peter Kershaw, London (CA); Andrew Paul Smith, London (CA)

(73) Assignee: Siemens Automotive Inc., Mississauga (CA)

( * ) Notice: Subject to any disclaimer, the term of this patent is extended or adjusted under 35 U.S.C. 154(b) by 0 days.

(21) Appl. No.: 10/199,798

(22) Filed: Jul. 19, 2002

(65) Prior Publication Data

US 2003/0048026 A1 Mar. 13, 2003

Related U.S. Application Data

(62) Division of application No. 09/822,304, filed on Mar. 28, 2001.
(60) Provisional application No. 60/227,175, filed on Aug. 23, 2000.

(51) Int. Cl.[7] .................. H01R 39/38; H01R 39/18; H01R 39/00; H02K 13/00
(52) U.S. Cl. .................. 310/239; 310/238; 310/248; 310/242; 310/219
(58) Field of Search ................ 310/248, 242, 310/239, 238, 219, 40 R

(56) References Cited

U.S. PATENT DOCUMENTS

| | | | | |
|---|---|---|---|---|
| 4,340,831 A | * | 7/1982 | Kuhlmann et al. | 310/239 |
| 4,342,934 A | * | 8/1982 | van Wijhe et al. | 310/239 |
| 4,600,850 A | * | 7/1986 | Mazzorana et al. | 310/242 |
| 4,638,204 A | * | 1/1987 | Kirchner et al. | 310/239 |
| 5,306,974 A | * | 4/1994 | Bates | 310/68 R |
| 5,397,952 A | * | 3/1995 | Decker et al. | 310/242 |
| 5,434,463 A | * | 7/1995 | Horski | 310/248 |
| 5,506,461 A | * | 4/1996 | Okabe | 310/239 |
| 5,717,271 A | * | 2/1998 | Aoki et al. | 310/242 |
| 5,734,219 A | * | 3/1998 | Horski et al. | 310/240 |
| 5,773,907 A | * | 6/1998 | Rubinchik | 310/248 |
| 5,952,763 A | * | 9/1999 | Bruhn | 310/238 |
| 6,020,668 A | * | 2/2000 | Rubinchik | 310/239 |
| 6,104,110 A | * | 8/2000 | Uchida et al. | 310/51 |
| 6,163,096 A | * | 12/2000 | Michenfelder et al. | 310/239 |
| 6,515,399 B1 | * | 2/2003 | Lauf et al. | 310/239 |
| 6,518,686 B2 | * | 2/2003 | Bailey et al. | 310/239 |
| 6,531,800 B2 | * | 3/2003 | Narushima et al. | 310/239 |
| 6,555,943 B2 | * | 4/2003 | Walther et al. | 310/239 |

* cited by examiner

*Primary Examiner*—Nestor Ramirez
*Assistant Examiner*—Pedro J. Cuevas

(57) ABSTRACT

A choke 10, for suppressing radio-frequency interference of a brush-type motor, includes a single wire having a portion 15 wound about a coil axis A to define a plurality of coils 14 including two outermost coils 16 and 18. An attaching structure 20 extends from each outermost coil and is disposed generally transverse with respect to the coil axis. Each attaching structure is constructed and arranged to be inserted through an associated opening in a supporting structure and to be bent so as secure the choke to the supporting structure. An elongated end portion 22 extends from each attaching structure so as to be spaced from and generally parallel to the coil axis. The elongated end portions extend in opposite directions. One of the elongated end portions is constructed and arranged to be directly electrically connected to an electrical connector of a motor and the other of the elongated end portions is constructed and arranged to be in electrical connection with a brush of the motor.

8 Claims, 1 Drawing Sheet

RADIO-FREQUENCY INTERFERENCE SUPPRESSING CHOKE WITH ELONGATED PORTIONS FOR BRUSH-TYPE MOTORS

This is a divisional of application Ser. No. 09/822,304, filed Mar. 28, 2001, which is hereby incorporated by reference.

This application is based on U.S. Provisional Application No. 60/227,175, filed Aug. 23, 2000 and claims the benefit thereof for priority purposes.

FIELD OF THE INVENTION

This invention relates to d.c. electric motors for automotive applications and, more particularly, to a choke having features for improved mechanical and electrical connection with components of a brush card assembly.

BACKGROUND OF THE INVENTION

Typical multi-pole automotive d.c. electric motors use bus bars to conduct current between the electrical connector of the motor and associated components such as chokes, capacitors, and brushes. Conventional bus bars have to be manufactured and physically attached, supported and connected with the motor. Typically, the bus bars are riveted to the brush card of the motor. The electrical connection is usually achieved using soldered or heat-fused joints.

Thus, there is a need to reduce the number of electrical connections required on the motor's brush card, to eliminate costly bus bars and to reduce the number of separate mechanical fasteners needed on the brush card.

Furthermore, conventionally, wound wire coils or chokes are installed close to the brushes of d.c. motors, particularly in automotive applications. The purpose of the chokes is to suppress radio-frequency interference (RFI) generated by the motor. Generally, the chokes are physically attached to the brush card of the motor using fixing or fastening techniques that require additional specific parts or processes, for example, the ends of the chokes may be soldered to conductors that are riveted to the brush card, the chokes may be installed within purpose-designed locations molded into the brush card, and/or clips or other fasteners may be used to attached the chokes.

Hence, there is also a need to provide secure mechanical attachment of the choke to the brush card while avoiding the necessity of either a molded brush card or specific fastening components.

SUMMARY OF THE INVENTION

An object of the present invention is to fulfill the needs referred to above. In accordance with the principles of the present invention, this objective is obtained by providing a choke for suppressing radio-frequency interference of a brush-type motor. The choke includes a single wire having a portion wound about a coil axis to define a plurality of coils including two outermost coils. An attaching structure extends from each outermost coil and is disposed generally transverse with respect to the coil axis. Each attaching structure is constructed and arranged to be inserted through an associated opening in a supporting structure and to be bent so as secure the choke to the supporting structure. An elongated end portion extends from each attaching structure so as to be spaced from and generally parallel to the coil axis. The elongated end portions extend in opposite directions. One of the elongated end portions is constructed and arranged to be directly electrically connected to an electrical connector of a motor and the other of the elongated end portions is constructed and arranged to be in electrical connection with a brush of the motor.

In accordance with another aspect of the invention, a brush card assembly for a d.c. motor includes at least one choke having a portion wound about a coil axis to define a plurality of coils including two outermost coils, an attaching structure extending from each outermost coil and being generally transverse with respect to the coil axis. An elongated end portion extends from each attaching structure so as to be spaced from and generally parallel to the coil axis, the elongated end portions extending in opposite directions. The assembly further includes a brush card having first and second opposing sides and a pair of openings through the opposing sides. Each attaching structure is disposed through an associated opening and bent so as to be adjacent to the second side, with the wound portion of the choke being disposed on the first side of the brush card, such that the choke is secured to the brush card. A brush is mounted on the brush card and is in electrical connection with one of the elongated end portions. An electrical connector is mounted on the brush card. The electrical connector has a terminal receiving the other elongated end portion of the choke.

In accordance with yet another aspect of the invention, a method of connecting a choke to a brush card assembly is provided. The choke include a portion wound about a coil axis to define a plurality of coils including two outermost coils. An attaching structure extends from each outermost coil and is disposed generally transverse with respect to the coil axis. An elongated end portion extends from each attaching structure so as to be spaced from and generally parallel to the coil axis. The elongated end portions extend in opposite directions. The brush card assembly includes a brush card having first and second opposing sides and a pair of openings through the opposing sides. A brush and an electrical connector are mounted on the brush card. The electrical connector has a terminal. The method includes the steps of inserting each attaching structure through an associated opening, with the wound portion of the choke being disposed on the first side of the brush card, bending each attaching structure so as to be adjacent to the second side, thereby securing the choke to the brush card, directly electrically connecting one of the elongated end portions with the terminal, and electrically connecting the other elongated end portion with the brush.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
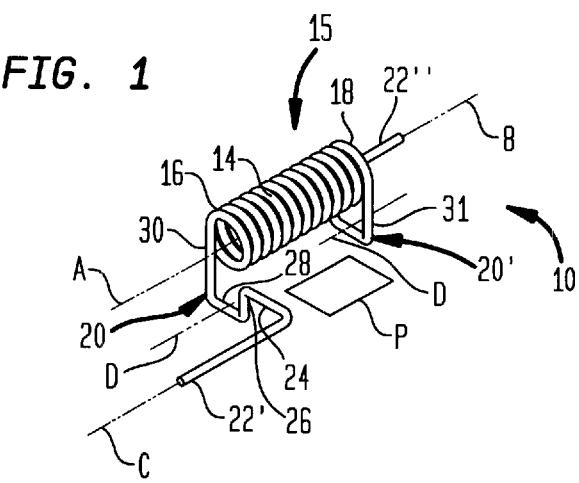
FIG. 1 is a perspective view of a choke for a d.c motor provided in accordance with the principles of the invention.

Referring to FIG. 1, a choke, generally indicated 10, for suppressing radio-frequency interference of a brush-type, multi-pole d.c. motor, is shown in accordance with the principles of the invention. The choke 10 comprises a single conductive wire 12 having a portion 15 wound about a coil axis A to define a plurality of coils 14 including two outermost coils, 16 and 18. The choke 10 includes an attaching structure, generally indicated at 20 and 20', extending from each of outermost coils 16 and 18, generally transverse with respect to the coil axis A. An elongated end portion 22 extends from each attaching structure 20 and 20' so as to be spaced from and generally parallel to the coil axis A. The elongated end portions 22 extend in opposite directions from the attaching structures 20 and 20' a distance substantially equal to a length of the portion 15 wound about the axis A. A center axis B and C of each elongated end portion 22 is disposed on a common plane P.

In the illustrated embodiment, attaching structure 20 includes a first portion 24 bent to extend transversely from an associated elongated end portion 22 and generally along the plane P. A second portion 26 is bent to extend downwardly and transversely with respect to the first portion 24. A third portion 28 is bent to extend from the second portion 26 so as to be generally parallel with the first portion 24, but below plane P. A fourth portion 30 bent to extend upwardly from the third portion 28 to the outermost coil 16. The fourth portion 30 is generally parallel with respect to the second portion 26.

Figure 2:
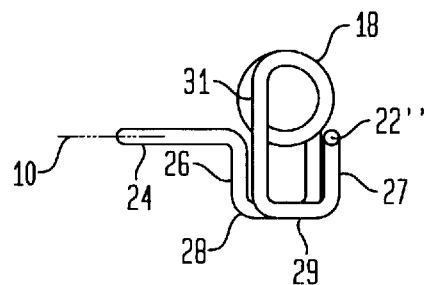
FIG. 2 is a right end view of the choke of FIG. 1.

As best shown in FIG. 2, attaching structure 20' includes a first portion 27 bent to extend downwardly and transversely with respect to the elongated end portion 22". A second portion 29 is bent to extend transversely from the first portion 27 below plane P. A third portion 31 bent to extend upwardly from the second portion 29 to the outermost coil 18. The third portion 31 is generally parallel with respect to the first portion 27.

Figure 3:
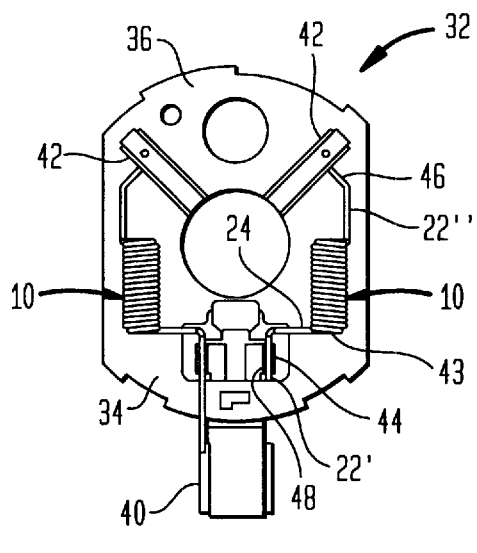
FIG. 3 is view of a front of a brush card assembly of the invention showing a pair of chokes mounted to a brush card and connected to terminals of a motor connector.
Figure 4:
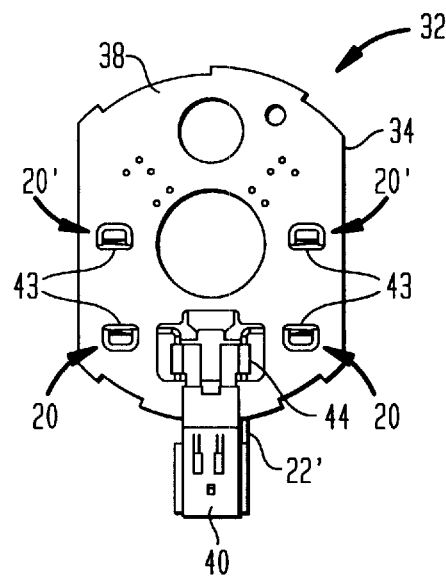
FIG. 4 is a view of the back of brush card assembly of the invention showing chokes crimped to secure the chokes to the brush card.

FIGS. 3 and 4 show the connection of chokes 10 of FIGS. 1 and 2 to a brush card assembly, generally indicated at 32. The brush card assembly 32 includes a brush card 34 having a first side 36 and an opposing second side 38. An electrical connector 40 and brushes 42 are mounted to the brush card 34. The brush card 34 includes two pairs of openings 43 therethrough. One pair of openings 43 is associated with one choke 10 for mounting the choke to the brush card 34. Each opening 43 is sized to receive an associated attaching structure 20 or 20" of the choke 10. Thus, during assembly each attaching structure 20 and 20' is disposed through an associated opening 43 with the wound portion 15 of the choke 10 being disposed on the first side 36 of the brush card 34. The attaching structures 20 and 20' are bent generally 90 degrees about axis D (which, as shown in FIG. 1, is parallel to the coil axis A) so as to engage, or at least be adjacent to, the second side 38 of the brush card 34 thus securing the choke 10 with respect to the brush card 34. In the illustrated embodiment, the attaching structures 20 and 20' are bent outwardly or away from each other, but it can be appreciated that the attaching structures 20 and 20' can be bent toward each other to achieve the same securing function.

The use of the attaching structures 20 and 20' avoids the need for separate choke fastening components or a molded brush card, provides a simple attachment of the chokes, and reduces the need for environmentally-sensitive solder pastes or adhesives.

As best shown in FIG. 3, since the end portions 22 are elongated, one of the end portions 22' is coupled to a terminal 44 of the connector 40. In particular, the terminal 44 defines an open channel 48 which receives at least a portion of the end portion 22'. The other end portion 22" is electrically coupled to a brush shunt wire 46.

The use of elongated end portions 22 of the choke 10 reduces the number of electrical connections required on the brush card, eliminates the costly manufactured bus bars, and reduces the number of separate mechanical fasteners need on the brush card.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A choke for suppressing radio-frequency interference of a brush-type motor, the choke comprising:

a single wire having a portion wound about a coil axis to define a plurality of coils including two outermost coils, an attaching structure extending from each outermost coil and being generally transverse with respect to the coil axis, each attaching structure being constructed and arranged to be inserted through an associated opening in a supporting structure and to be bent so as secure the choke to the supporting structure, and an elongated end portion extending from each attaching structure so as to be spaced from and generally parallel to the coil axis, the elongated end portions extending in opposite directions, one of the elongated end portions being constructed and arranged to be directly electrically connected to an electrical connector of a motor and the other of the elongated end portions being constructed and arranged to be in electrical connection with a brush of the motor.

2. The choke of claim 1, wherein a center axis of each elongated end portions is disposed on a common plane.

3. The choke of claim 2, wherein at least one of the attaching structures includes a first portion extending transversely from an associated elongated end portion and generally along the common plane, a second position extending downwardly and transversely with respect to the first portion, a third portion extending from the second portion so as to be generally parallel with the first portion, and a fourth portion extending upwardly from the third portion to an associated outermost coil, the fourth portion being generally parallel with respect to the second portion.

4. The choke of claim 2, wherein at least one of the attaching structures includes a first portion extending downwardly and transversely with respect to an associated elongated end portion, a second portion extend transversely from the first portion and a third portion extending upwardly from the second portion to an associated outermost coil, the third portion being generally parallel with respect to the first portion.

5. The choke of claim 2, wherein the elongated end portions are disposed in spaced relation.

6. The choke of claim 1, wherein each elongated end portion extends from an attaching structure a distance substantially equal to a length of the portion wound about the axis.

7. A method of connecting a choke to a brush card assembly, the choke including a portion wound about a coil axis to define a plurality of coils including two outermost coils, an attaching structure extending from each outermost coil and being generally transverse with respect to the coil axis, and an elongated end portion extending from each attaching structure so as to be spaced from and generally parallel to the coil axis, the elongated end portions extending in opposite directions, the brush card assembly including a brush card having first and second opposing sides and a pair of openings through the opposing sides, a brush mounted on the brush card, and an electrical connector mounted on the brush card, the electrical connector having a terminal, the method including the steps of:

inserting each attaching structure through and associated opening, with the wound portion of the choke being disposed on the first side of the brush card, bending each attaching structure so as to be adjacent to the second side, thereby securing the choke to the brush card, directly electrically connecting one of the elongated end portions with the terminal, and electrically connecting the other elongated end portion with the brush.

8. The method of claim 7, wherein the terminal includes an opened channel and the method includes receiving at least a portion of said one elongated end portion in the opened channel.

* * * * *